United States Patent
Sakuragi et al.

(10) Patent No.: US 8,860,995 B2
(45) Date of Patent: Oct. 14, 2014

(54) IMAGE FORMATION APPARATUS EXECUTING PREPARATION OPERATION BASED ON CHECK REQUEST

(75) Inventors: Yuichiro Sakuragi, Nagoya (JP); Shohei Nagai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/599,936

(22) Filed: Aug. 30, 2012

(65) Prior Publication Data

US 2013/0050760 A1  Feb. 28, 2013

(30) Foreign Application Priority Data

Aug. 31, 2011 (JP) ................... 2011-188279
May 8, 2012 (JP) ................... 2012-106839

(51) Int. Cl.
*G06F 3/12* (2006.01)
(52) U.S. Cl.
CPC ............ *G06F 3/1213* (2013.01); *G06F 3/1229* (2013.01); *G06F 3/1285* (2013.01); *G06F 3/1232* (2013.01)
USPC ....................................................... 358/1.15
(58) Field of Classification Search
None
See application file for complete search history.

(56) References Cited

U.S. PATENT DOCUMENTS

| | | | | |
|---|---|---|---|---|
| 2002/0041389 A1* | 4/2002 | Noda | ........................... | 358/1.14 |
| 2006/0221379 A1* | 10/2006 | Noda | ........................... | 358/1.14 |
| 2008/0266597 A1* | 10/2008 | Ushio | ........................... | 358/1.15 |
| 2009/0103939 A1* | 4/2009 | Ushio | ........................... | 399/82 |

FOREIGN PATENT DOCUMENTS

| | | | |
|---|---|---|---|
| JP | 2001-177679 A | 6/2001 |
| JP | 2005-284938 A | 10/2005 |
| JP | 2010-199670 A | 9/2010 |

* cited by examiner

*Primary Examiner* — Jeremiah Bryar
(74) *Attorney, Agent, or Firm* — Merchant & Gould PC

(57) ABSTRACT

An image formation apparatus, which is connected to an external device and which forms an image based on a print data sent from the external device, includes a request receiving section for receiving a check request for a print setting associated with the print data; a response section for responding to the external device with an answer to the check request having received by the request receiving section; a data receiving section for receiving the print data from the external device after the response section responds to the external device; a printing section for carrying out printing for the print data received by the data receiving section; and a preparation operation section for executing a preparation operation for printing based on the print data after the request receiving section receives the check request and before the data receiving section receives the print data.

7 Claims, 11 Drawing Sheets

| CHECK ITEM | SETTING VALUE |
|---|---|
| PAPER SIZE | A4 |
| BOTH SIDES | OFF |
| COLOR | ON |
| RESOLUTION | 1200dpi |
| PAPER TYPE | PLAIN PAPER |
| NUMBER OF COPIES | 1 |
| USER NAME | XXXXXX |

IMAGE FORMATION APPARATUS EXECUTING PREPARATION OPERATION BASED ON CHECK REQUEST

CROSS REFERENCE TO RELATED APPLICATION

The present application claims priorities from Japanese Patent Application No. 2011-188279, filed on Aug. 31, 2011 and Japanese Patent Application No. 2012-106839, filed on May 8, 2012, the disclosures of which are incorporated herein by reference in their entirety.

BACKGROUND OF THE INVENTION

1. Field of the Invention

The present invention relates to an image formation apparatus which receives print data from an external device and performs printing of the print data. In more detail, the present invention relates to the image formation apparatus which receives a request (inquiry) for print prevision before receiving the print data from the external device.

2. Description of the Related Art

Conventionally, there have been image formation apparatuses known to first accept a request (inquiry) for print prevision from an external device, and then receive print data from the same external device to carry out printing of the print data. Such inquiry includes, for example, asking about capability and condition of the image formation apparatuses.

For instance, Japanese Patent Application Laid-Open No. 2005-284938 discloses an image formation apparatus which accepts a preliminary inquiry from an external device as described hereinabove. In the technique disclosed in Japanese Patent Application Laid-Open No. 2005-284938, a client computer inquires of a plurality of printers about capability and condition. The client computer searches for (lists) printers meeting a priority condition after acquiring the capability and condition of each printer with the response from each printer. Then, the user selects a printer for carrying out printing from the searched (listed) printers, and the client computer sends print data to the selected printer.

However, there is a problem as below in the conventional image formation apparatus described hereinabove. That is, the image formation apparatus replies about the capability and condition according to the preliminary inquiry, and then receives print data. With respect to printing of the print data, the image formation apparatus carries out, as necessary, preparation operations for the printing such as a correction process for adjusting image position and concentration deviation, a warm-up process for heating the fixation device to a predetermined temperature, etc. The image formation apparatus can not start printing until the preparation operation is completed. In other words, since the image formation apparatus starts the preparation operation after the image formation apparatus receives the image data, there is a waiting time for the preparation operation between the receiving time of the image data and the start time of the printing.

SUMMARY OF THE INVENTION

Accordingly, the present invention is configured to solve the above problem in the conventional image formation apparatuses. That is, an object of the present invention is to provide an image formation apparatus capable of shortening the waiting time from the receiving time of the image data till the start time of the printing, after the image formation apparatus receives the preliminary inquiry from the external apparatus.

According to an aspect of the present teaching, there is provided an image formation apparatus which is configured to communicate with an external device and which forms an image based on a print data sent from the external device, the apparatus including: a request receiving section configured to receive a check request, from the external apparatus, with respect to a print setting associated with the print data which is to be sent from the external apparatus; a response section configured to respond to the external device with a check result after the request receiving section receives the check request; a data receiving section configured to receive the print data from the external device after the response section responds to the external device; a printing section configured to execute printing based on the print data received by the data receiving section; a preparation operation section configured to execute a preparation operation for printing based on the print data; and a judgment section configured to judge as to whether or not the print setting satisfies a start condition for starting the preparation operation under a condition that the request receiving section receives the check request; wherein: under a condition that the request receiving section receives the check request and the judgment section judges that the print setting satisfies the start condition, the preparation operation section starts the preparation operation corresponding to the print setting before the data receiving section receives the print data; and under a condition that the request receiving section receives the check request and the judgment section judges that the print setting does not satisfy the start condition, the preparation operation section does not start the preparation operation corresponding to the print setting before the data receiving section receives the print data.

The image formation apparatus in accordance with the present teaching accepts, from an external device, a check request for a print setting associated with the print data. This request is often outputted before a print command to the image formation apparatus, and thus can be referred to as requests for print prevision (preliminary inquiry). Then, the image formation apparatus starts preparation operations for printing after receiving the preliminary inquiry but before receiving the print data. The preparation operations for printing correspond to, for example, correction of positional deviation, correction of concentration, and warm-up of the fixation device.

That is, the image formation apparatus of the present teaching starts the preparation operations for printing on the occasion of accepting a preliminary inquiry for print prevision before receiving the print data. By virtue of this, it is expectable to finish printing in a short time as a result of starting the preparation operations for printing at an earlier stage.

DESCRIPTION OF THE PREFERRED EMBODIMENT

Hereinbelow, referring to the accompanying drawings, explanations will be made in detail with respect to a preferred embodiment of a printing apparatus in accordance with the present teaching. In the embodiment, the present teaching is applied to a printer connected to a personal computer (PC).

<A Configuration of the Printer>

Figure 1:
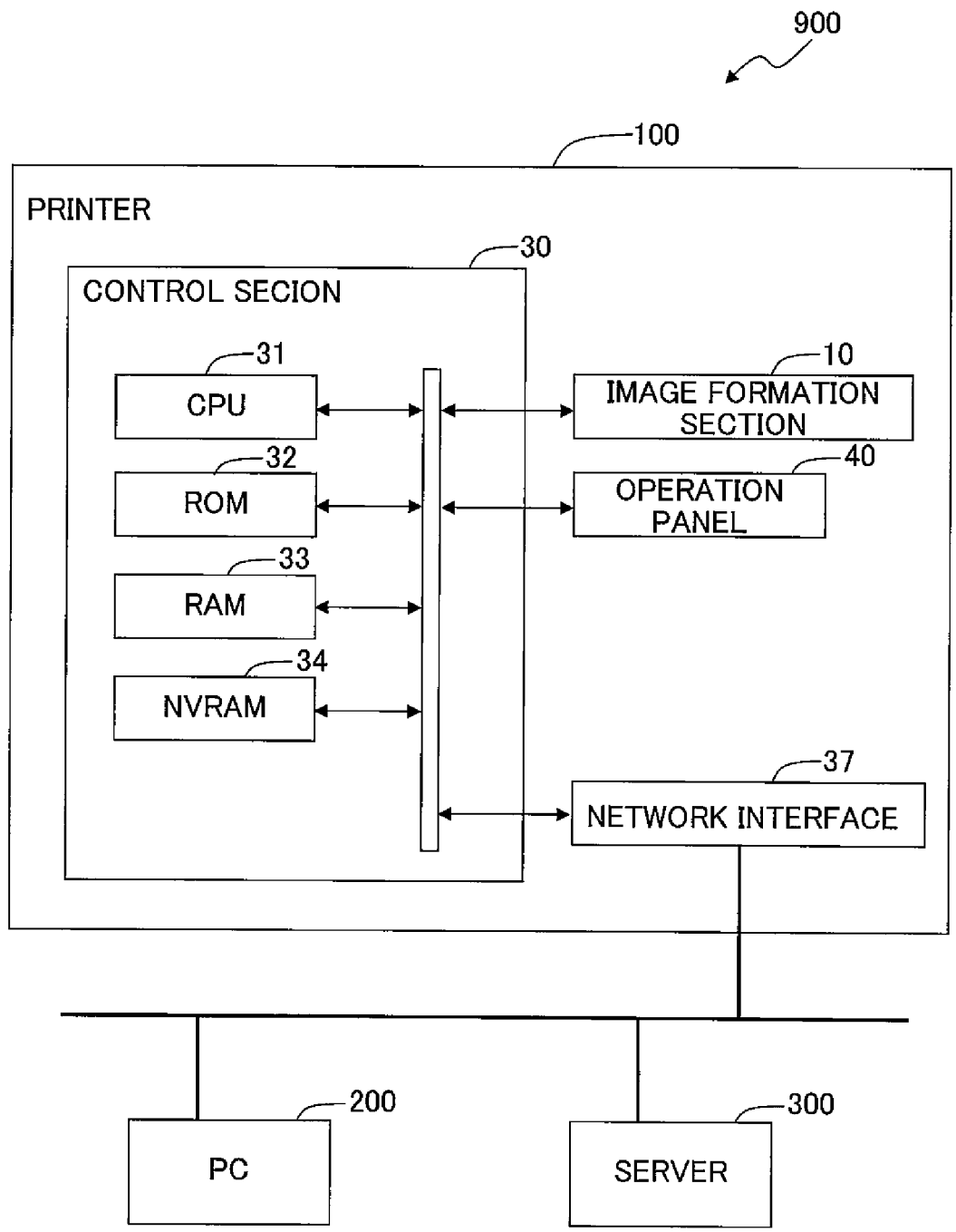
FIG. 1 is a block diagram showing an electrical configuration of a printer in accordance with an embodiment of the present teaching.

As shown in FIG. 1, a printer 100 of the embodiment (an example of the printing apparatus) is provided with a control section 30 including a CPU 31, a ROM 32, a RAM 33, and an NVRAM 34 (Non Volatile RAM). Further, the control section 30 is electrically connected with an image formation section 10 for printing images on printing paper, an operation panel 40 for displaying operating conditions and accepting user's input manipulations, and a network interface 37.

The ROM 32 stores firmware which is control programs for controlling the printer 100, and a variety of setting and initial values. The RAM 33 and NVRAM 34 are utilized as working areas for reading out the various control programs, or as storage areas for temporarily storing print data.

The CPU 31 (an example of the request reception section, response section, data reception section, determination section, second determination section, execution determination section, stop section, and print determination section) controls each component of the printer 100 while storing the processing result in the RAM 33 or the NVRAM 34 according to the control programs read out from the ROM 32 and the signals sent from various sensors.

The network interface 37 is an interface enabling the printer 100 to communicate with other devices. The printer 100 receives print data sent from other devices through the network interface 37. In the embodiment, the printer 100 is capable of communications with a PC 200 (personal computer) and a server 300 through the network interface 37, constituting a printing system 900.

Further, the image formation section 10 (an example of the printing section) may adopt either an electrophotographic method or an ink jet method as the image formation method as long as it is capable of printing images on printing paper. Further, the image formation section 10 may either be capable of color print or be dedicated to black-and-white print. In the embodiment, it adopts the electrophotographic method, and is capable of color print.

Further, the operation panel 40 has various buttons for accepting user's inputs, and a touch screen for displaying character information, buttons, and the like. As the various buttons, for example, there are an OK button for instruction to start a printing operation, and a cancel button for instruction to cancel a printing operation.

<A Configuration of the Image Formation Section>

Next, referring to FIG. 2, explanations will be made with respect to the image formation section 10 of the printer 100. The image formation section 10 is configured to form a toner image by the electrophotographic method, and include a processing section 50 for transferring the toner image to printing paper and a fixation device 8 for fixing the unfixed toner on the printing paper.

The processing section 50 is configured to be capable of forming color images, and process sections in respective correspondence with the colors of cyan (C), magenta (M), yellow (Y), and black (K) are arranged in parallel. In particular, the processing section 50 includes a process section 50C for forming images in the color C, a process section 50M for forming images in the color M, a process section 50Y for forming images in the color Y, and a process section 50K for forming images in the color K. Then, in the direction of conveying printing paper, the process sections 50C, 50M, 50Y and 50K are arranged at regular intervals in sequence from the downstream side. Further, arrangement of the process sections should not be limited to this sequence.

Further, the image formation section 10 includes an exposure device 53 for irradiating each of the process sections 50C, 50M, 50Y and 50K with light, and a conveyor belt 7 for conveying the printing paper to the transfer position for each of the process sections 50C, 50M, 50Y and 50K.

Figure 2:
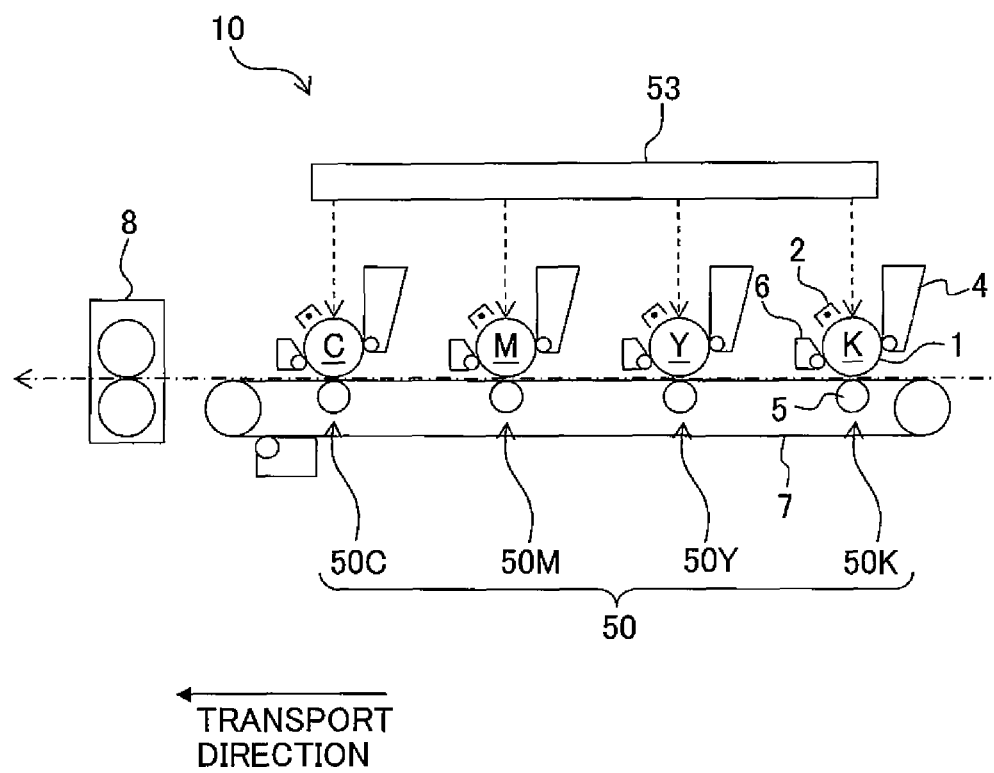
FIG. 2 shows a configuration of an image formation section of the printer.

The process section 50K has a drum-shaped photoreceptor 1 for rotating clockwise direction in FIG. 2, a charging device 2 for uniformly electric-charging the surface of the photoreceptor 1, a developing device 4 for carrying out development with the toner for electrostatic latent images, a transfer device 5 for transferring the toner image on the photoreceptor 1 to the sheet of paper, and a cleaner 6 for electrically capturing toner left on the photoreceptor 1 from the surface of the photoreceptor 1 after transfer. The photoreceptor 1 and the transfer device 5 are arranged in contact with the conveyor belt 7. Further, the photoreceptor 1 faces the transfer device 5 with the conveyor belt 7 intervening therebetween. The other process sections 50C, 50M and 50Y are all configured in the same manner as the process section 50K.

In each of the process sections 50C, 50M, 50Y and 50K, the surface of the photoreceptor 1 is uniformly charged by the charging device 2, and then exposed to the light from the exposure device 53 to form an electrostatic latent image for the image to be formed on the printing paper. Next, toner is supplied to the photoreceptor 1 through the developing device 4. By virtue of this, the electrostatic latent image on the photoreceptor 1 is visually imaged as a toner image.

The image formation section 10 picks up one sheet of the printing paper at a time from a paper feeder of the printer 100 (not shown) and transports the same onto the conveyor belt 7. Then, the toner image formed in the processing section 50 is transferred to the printing paper. In color print, the toner image is formed in each of the process sections 50C, 50M, 50Y and 50K, and the respective toner images are superimposed on the printing paper. On the other hand, in black-and-white print, the toner image is formed only in the process section 50K and transferred to the printing paper. Thereafter, the printing paper with the transferred toner image is transported to the fixation device 8 to heat-fix the toner image on the printing paper. Then, the printing paper after fixation is discharged out of the device.

<A Configuration of the Printing System>

Figure 3:
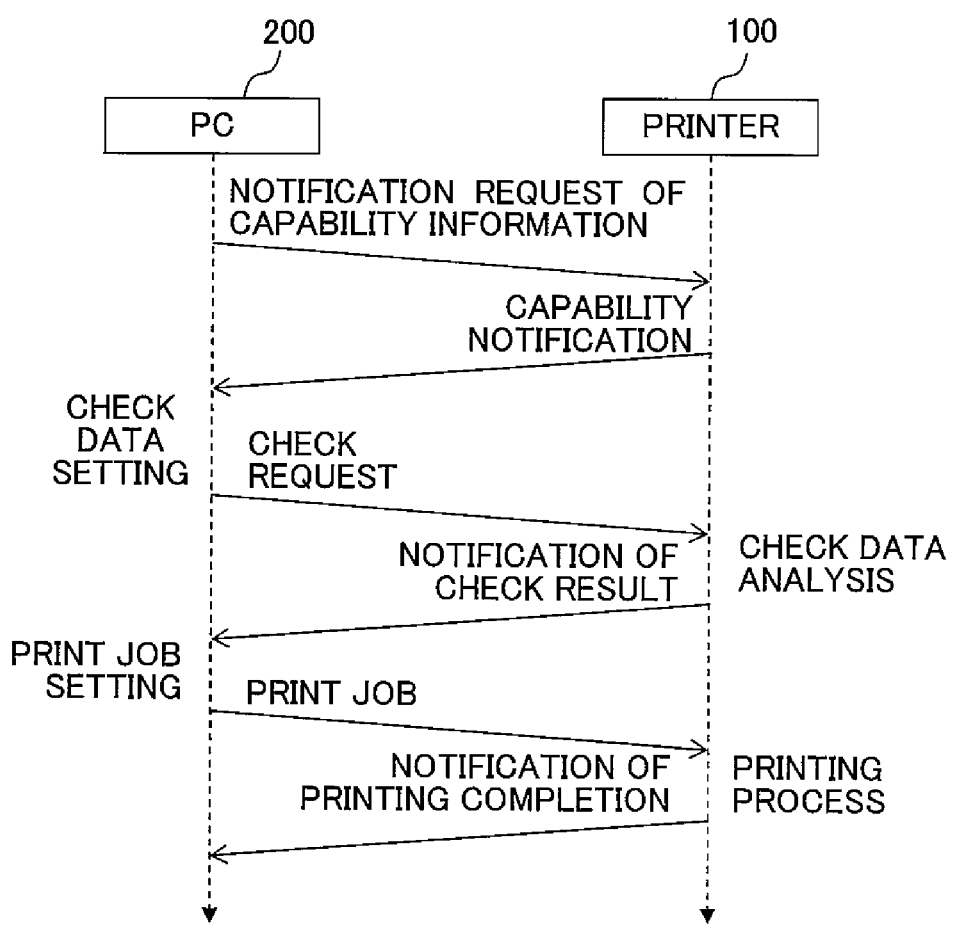
FIG. 3 is a timing chart showing a timing of data transmission between the printer and a personal computer.

Next, referring to FIG. 3, explanations will be made with respect to a printing operation of the printing system 900 including the printer 100 and the PC 200.

In the printing system 900, each time the PC 200 accepts a printer search instruction from the user, the PC 200 sends a notification request of capability information, which is a request to a printer for notification of its own specification. If the target printer is designated, then the PC 200 sends the notification request of capability information to the designated printer; if no target printer is designated, then it broadcasts the notification request of capability information to all printers capable of communications.

On receiving the notification request of capability information, the printer 100 notifies the requester PC 200 of its own specification. In the capability notification, at least the specification information of a printer is notified. It may not include the status information such as any shortage of toner, paper out, and the like, for determining whether or not the printer is in a printable state.

If the PC 200 receives capability notifications from a plurality of printers, then the PC 200 displays the printers in a list. When the user selects a printer for carrying out printing from the list, the PC 200 displays a print setting screen for the selected printer 100 to accept input of print setting from the user. The print setting screen is generated based on the capability notification received from the printer 100, thereby allowing for input of print settings performable by the printer 100. In other words, it is not allowed to input print settings which are not performable by the printer 100. For example, if the capability notification includes information that only single-side printing is possible, then it is not allowed to input settings of both-side printing. If the PC 200 receives the capability information only from one printer 100, the PC 200 may display the print setting screen for the one printer 100 without displaying the list.

Figure 4:
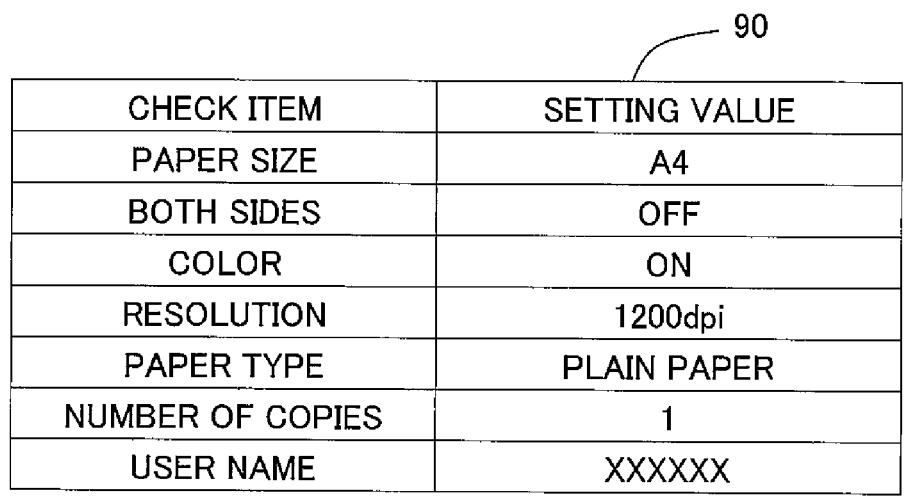
FIG. 4 shows a configuration of check data.
Figure 5:
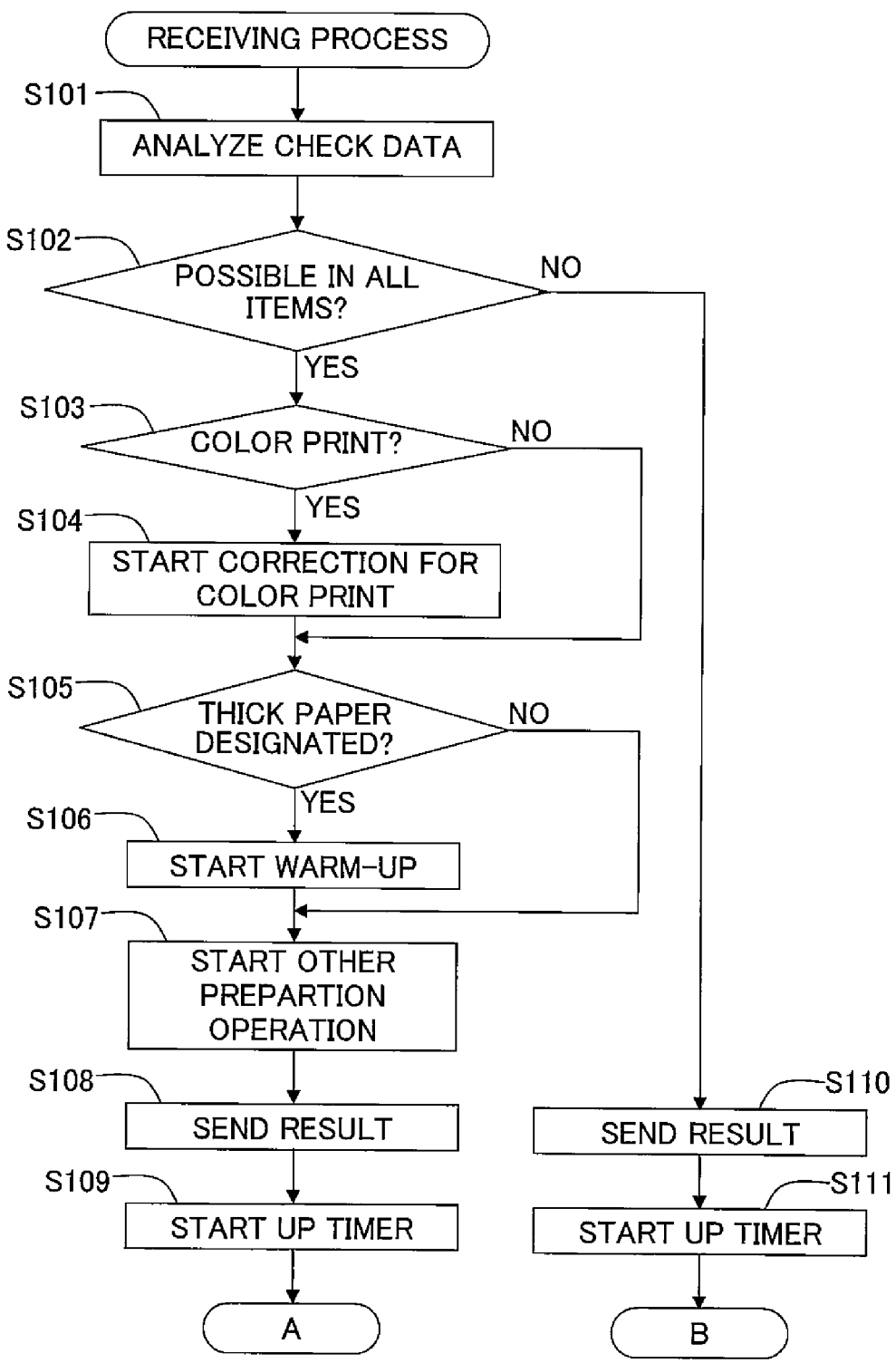
FIGS. 5, 6A, 6B, 7A and 7B show a flowchart showing a procedure of a reception process of the printer.

After the user has finished the print setting and the PC 200 accepted a print command, the PC 200 sends an check request to the printer 100 according to the print setting. A check data 90 as shown in FIG. 4 is added to the check request, which is sent, for example, when utilizing the function of cloud print to allow for printing without installing software of the printer 100 to the PC 200. In the case of applying cloud print, the notification request of capability information and the check request conform to IPP 2.0 which is the protocol of cloud print.

The check data 90 includes the contents of print setting associated with the print data (including at least the size of printing paper, both-side print setting, color setting, resolution, the type of printing paper, and the number of print copies in the embodiment), and the user name. Further, the data structure shown in FIG. 4 is an example of listing the typical items of print setting, and thus should not be limited thereto. For example, the check data 90 may as well include a more detailed print setting. Alternatively, it may as well include fewer items than those shown in FIG. 4. The check data 90 includes the print setting for a print data but does not include the print data per se.

On receiving the check request, the printer 100 analyzes whether or not it is possible for the printer 100 to print in accordance with the setting value in the check data 90 added to the check request with respect to each check item. This analysis takes into consideration not only the specification of the printer itself but also its status (the state of shortage of toner, paper out and the like). Therefore, even though it is possible to print by considering only the specification of the printer, if the printer is in a state unable to carry out printing, then the printer 100 judges that printing is not possible. For example, even if the printer is capable of color print but is detected to be short of the toner of a certain color, then it is not possible to carry out color print. In this manner, even if color print is possible according to the specification of the printer, it may still be impossible according to the status of the printer. In such cases, the printer 100 judges that printing is not possible. Further, if the printer 100 has been set to forbid printing by a specific user, then it judges that printing is not possible with respect to the check request from that specific user. Then, the printer 100 sends the analysis result to the PC 200 as a notification of check result.

After receiving the notification of check result, if printing is possible, then the PC 200 creates a print job according to the print setting and sends the same to the printer 100. The print job includes the print setting and the print data of the print object. If printing is not possible, then the print command is cancelled. Alternatively, the PC 200 may as well request the user to input another print setting. Still alternatively, it may as well inquire of the user about whether or not to carry on printing even though the printing according to the print setting is impossible or unacceptable.

On receiving the print job, the printer 100 carries out printing for the print data included in the print job according to the print setting included in the print job. After the printing is completed, it sends a notification of printing completion to the PC 200. Further, if error arises in the printing, then it sends the content of error to the PC 200.

<Control of the Printer>

Next, referring to the flowcharts of FIGS. 5 to 10, explanations will be made with respect to a reception process (an example of the process of the preparation operation section, response section, data reception section, printing section, judgment section, second judgment section, execution judgment section, stop section, and print judgment section) of the printer 100 for realizing a printing operation of the printing system 900 described hereinabove. The control section 30 of the printer 100 carries out the reception process on the occasion that the printer 100 has received a check request.

In the reception process, first, the printer 100 analyzes whether or not printing is possible with respect to each item of the print setting included in the check data 90 (S101). Then, based on the analysis result, the printer 100 judges whether or not printing is possible with respect to all items of the print setting (S102; an example of the process of the print judgment section).

If printing is possible with respect to all items of the print setting, that is, it is possible to execute printing which satisfies the print setting (S102: Yes), then it is possible for the user to carry out the printing to satisfy the entered print setting. Therefore, it is highly possible that the print data according to the print setting will be sent from the PC 200 to the printer 100 after the printer 100 sends the analysis result to the PC 200.

Figure 8:
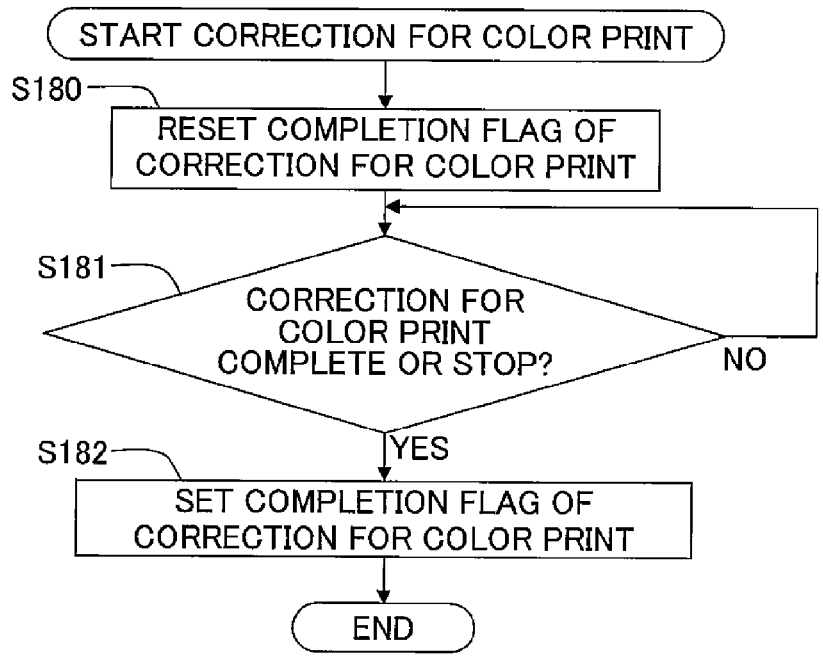
FIG. 8 shows a flowchart showing a procedure of correction for color print.

Next, the printer 100 judges whether or not the setting for color print is "ON" in the print setting of the check data 90, that is, whether or not it satisfies the start condition for starting a preparation operation for printing (S103; an example of the process of the judgment section). If the setting for color print is "ON", that is, the start condition is satisfied (S103: Yes), then as a preparation operation for printing, a correction process is started for color print by the printer 100 (S104; an example of the process of the preparation operation section). The correction process for color print corresponds to, for example, correction of positional deviation and/or correction of concentration. After starting the correction process for color print, the process proceeds to the step S105. Further, if the correction process for color print is started, then a process shown in FIG. 8 is started in parallel. If the correction process for color print shown in FIG. 8 is started, then, first, a completion flag of correction for color print is reset (S180). Next, it is judged whether the correction process for color print is ended or stopped (S181). Then, the process stands by until the correction process for color print is ended or stopped (S181: No). If the correction process for color print is ended or stopped (S181: Yes), then the completion flag of correction for color print is reset (S182), and the correction process for color print is ended. Further, when it is ready to carry out the step S104, if the printer 100 is in the course of print processing for other print data, then the correction process is not started until the print processing is finished. On the other hand, if the setting for color print is "OFF" (S103: No), then it is unnecessary for the printer 100 to carry out the correction process for color print. Therefore, the printer 100 does not carry out the correction process for color print, and the process proceeds to the step S105.

That is, in the correction process for color print, because marks such as resist patterns and the like are formed on the conveyor belt 7, processes are required to read in the marks for calculation of the correction value, and thus it is predicable that it takes some time to complete the correction process. Therefore, when the printer 100 receives the check data 90 as a preliminary inquiry for print prevision, if the setting for color print is "ON", then by starting the correction process for color print before accepting the print job, it is possible to shorten the waiting time from the accepting the print job until ending the correction process for color print and starting printing. On the other hand, if the setting for color print is "OFF", then without carrying out the unnecessary correction process for color print, it is possible to save the electricity and time necessary for the correction process for color print.

Figure 9:
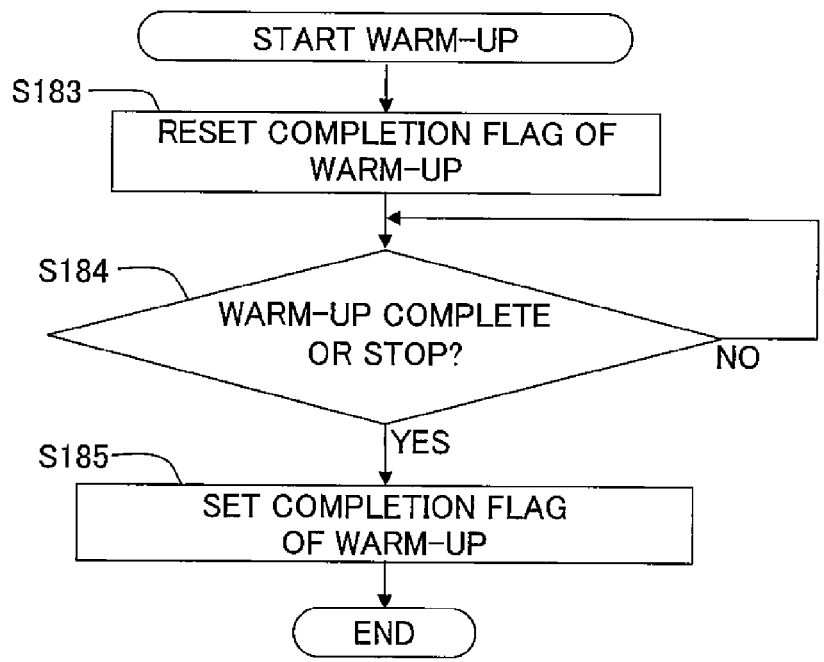
FIG. 9 shows a flowchart showing a procedure of warm-up.

Next, the printer 100 judges whether or not the type of printing paper is set to be thick paper in the print setting of the check data 90, that is, whether or not it satisfies the start condition for starting a preparation operation for printing (S105; an example of the process of the judgment section). If the type of printing paper is set to be thick paper, that is, the start condition is satisfied (S105: Yes), then as a preparation operation for printing, the printer 100 starts warm-up of a heater of the fixation device 8 (S106; an example of the process of the preparation operation section). After the warm-up is started, the process proceeds to the step S107. Further, if the warm-up is started, then a process shown in FIG. 9 is started in parallel. If the warm-up of FIG. 9 is started, then the printer 100 resets a completion flag of warm-up (S183). Next, the printer 100 judges whether the warm-up is ended or stopped (S184). The printer 100 stands by until the warm-up is ended or stopped (S184: No). If the warm-up is ended or stopped (S184: Yes), then the printer 100 sets the completion flag of warm-up (S185), and ends the warm-up process. On the other hand, if the type of printing paper is not set to be thick paper (S105: No), then the printer 100 does not start the warm-up, and the process proceeds to the step S107. In the step S107, the printer 100 starts other preparation operations for printing. After starting the other preparation operations for printing, the process proceeds to the step S108. Further, if the other preparation operations are started, then the printer 100 resets the completion flag of each of the started preparation operations. When each of the preparation operations is ended or stopped, the printer 100 sets each of the completion flags which are reset.

That is, it is also predictable that in warming up the heater of the fixation device 8, it takes some time for the heater to reach a predetermined temperature. Therefore, when the printer 100 receives the check data 90 as a preliminary inquiry, if the setting for paper type is thick paper, then by starting the warm-up before accepting the print job, it is possible to shorten the waiting time from accepting the print job until ending the warm-up and starting printing. On the other hand, if the setting for paper type is not thick paper, then without carrying out the unnecessary warm-up, it is possible to save the electricity and time necessary for the warm-up.

In this manner, in the preferred embodiment, there are a plurality of preparation operations for printing, and for each of the preparation operations, a start condition is set for starting the preparation operation. Then, the printer 100 judges whether or not the print setting of the check data 90 satisfies the start condition corresponding to each preparation operation, respectively. Further, in the preferred embodiment, although the printer 100 carries out the preparation operations in the order of correction for color print (S104) and warm-up (S106), the order of these preparation operations may be arbitrary. Further, it is not necessary to start all preparation operations. Expectation for early start of printing can be raised by starting at least one of the preparation operations for printing. In particular, explanations will be made with a case of carrying out the warm-up as a preparation operation for printing and, for example, the correction process for color print with a longer processing time than the warm-up. Conventionally, after receiving a print data, the warm-up and correction process for color print are carried out, and the printer cannot start printing until the end of the correction process for color print with the long processing time. In contrast to this, in the present teaching, on the timing of receiving the check data for print prevision, the correction process for color print with the long processing time is carried out, and if the print data is received thereafter, then the warm-up is carried out on the reception timing. If the correction process for color print is ended and the warm-up is finished, then it is possible to start printing. In the present teaching, because the correction process for color print is carried out before the print data is received, it is possible to start printing at an earlier stage than carrying out the correction process for color print after receiving the print data. Further, it is not necessary for the printer 100 to carry out all of the judgment of every item in the step S102, the judgment of color print in the step S103 and the judgment of thick paper in the step S105. Instead, for example, it may as well be configured to carry out the step S103 only but not carry out the steps S102 and S105 (that is, in the flowchart of FIG. 5, the process is configured to include only the steps S101, S103, S104, S107, S108, and S109).

Further, if printing is not possible with respect to at least one item of the print setting of the check data 90, that is, it is not possible for the printer 100 to execute printing which satisfies the print setting (S102: No), then it is highly possible for the user to cancel the print command after the printer 100 responds to the PC 200 with the analysis result. In this case, because the printing intended by the user is not possible with the printer 100, it is highly possible to search for other printers to carry out the printing intended by the user. Further for example, if the print setting is for color print but some color toner has come short in the printer 100, then the print setting may possibly be changed to the black-and-white print. Therefore, it is highly possible that a preparation operation for printing goes to waste even if the printer 100 starts the preparation operation for printing. Hence, the printer 100 does not start the preparation operations for printing, and the process proceeds to the step S108.

In the step S108, the printer 100 sends the analysis result obtained from the step S101 to the PC 200 which has sent the check request (S108; an example of the process of the response section). After sending the analysis result, the printer 100 starts up a timer (S109), waiting to receive a print job including the print data. The process proceeds from "A" of FIG. 5 to "A" of FIG. 6A. In the step S110, the printer 100 sends the analysis result obtained in the step S101 to the PC 200 which has sent the check request (S110; an example of the process of the response section). After sending the analysis result, the printer 100 starts up the timer (S111), waiting to receive a print job including the print data. The process proceeds from "B" of FIG. 5 to "B" of FIG. 7A.

Figure 6A:
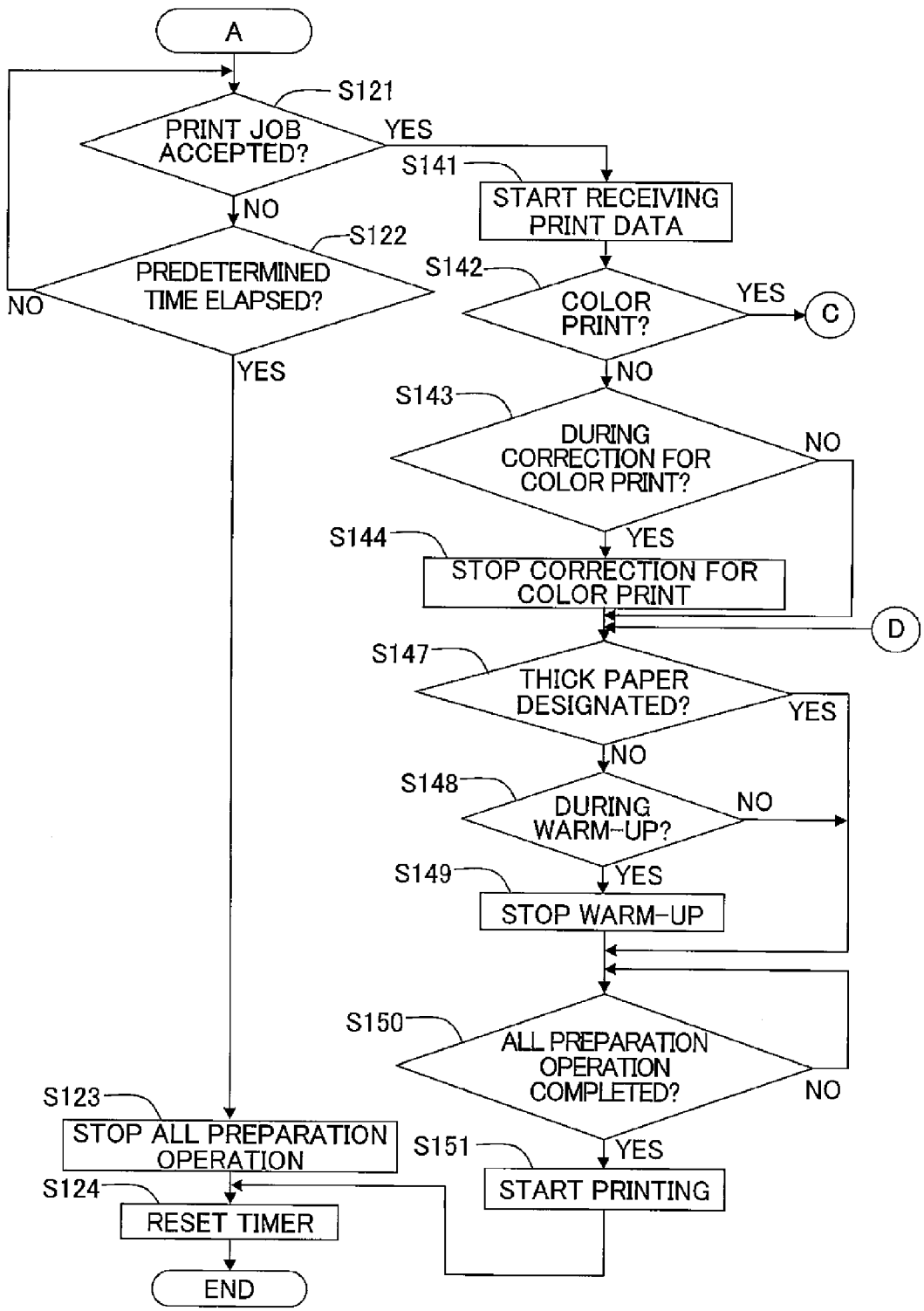
Figure 6B:
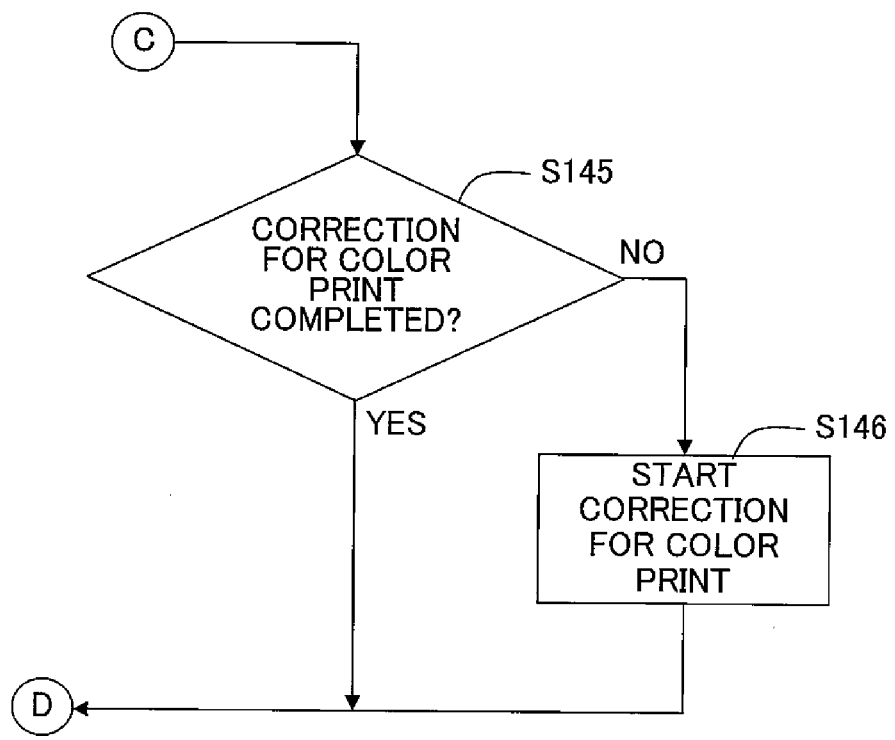

Next, in FIG. 6A, the printer 100 judges whether or not it has accepted a print job from the PC 200 which sent the check data (S121). If the printer 100 has not accepted the print job (S121: No), then it judges whether or not the time kept by the timer is longer than or equal to a predetermined period of time (S122). If the time kept by the timer is shorter than the predetermined period of time (S122: No), then the process returns to the step S121 and the printer 100 waits to receive a print job. Further, the predetermined period of time in the step S122 is set to be, for example, two to three minutes or so.

If the time kept by the timer is longer than or equal to the predetermined period of time (S122: Yes), then the printer 100 judges that either the user has cancelled the print command or the user has no intention of printing. Hence, the printer 100 stops all preparation operations for printing (S123). Further, in order to be in a state of indicating completion of the preparation operations, the printer 100 sets the completion flags corresponding to the preparation operations. Furthermore, the printer 100 stops and resets the timer (S124), and then ends the reception process.

Figure 10:
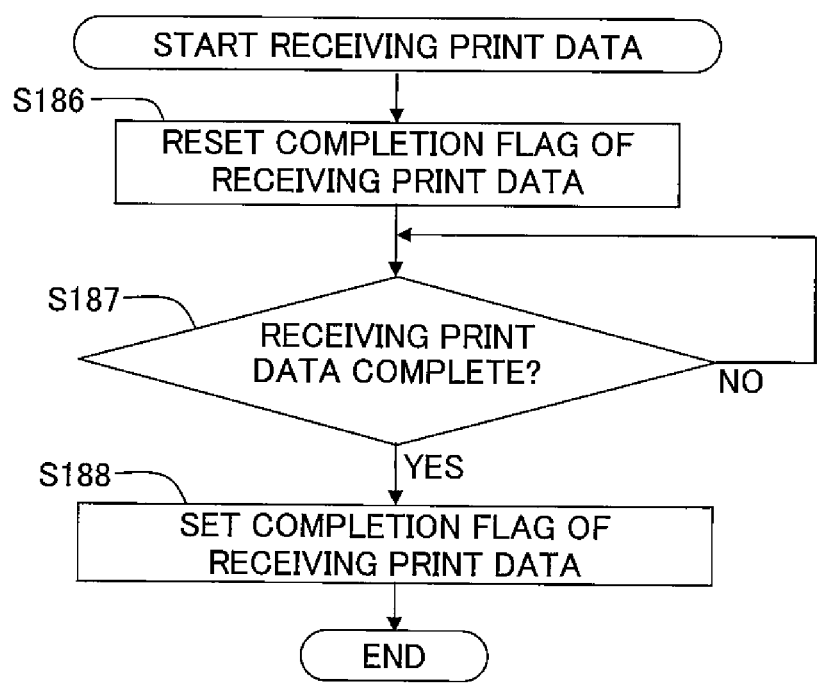
FIG. 10 shows a flowchart showing a procedure of receiving print data.

On the other hand, if the printer 100 has accepted a print job from the PC 200 which has sent the check data (S121: Yes), then it starts receiving the print data (S141; an example of the process of the data reception section). The print data received by the printer 100 is stored into the memory area. If the print data reception is started, then a process shown in FIG. 10 is started in parallel. If the print data reception shown in FIG. 10 is started, then the printer 100 resets a completion flag of receiving print data (S186). Next, the printer 100 judges whether the print data reception is ended (S187). The printer 100 stands by until the print data reception is ended (S187: No). If the print data reception is ended (S187: Yes), then the printer 100 sets the completion flag of receiving print data (S188), and ends this process.

After the step S141, the printer 100 judges whether or not the setting for color print is "ON" in the print setting for the print job, that is, whether or not it satisfies the execution condition for executing a preparation operation for printing (S142; an example of the process of the second judgment section). If the setting for color print is "OFF", that is, the execution condition is not satisfied (S142: No), then the printer 100 judges whether or not the correction process for color print is being carried out, that is, whether or not the preparation operation corresponding to the execution condition is being carried out (S143; an example of the process of the execution judgment section). For example, even though color print is set to be "ON" in the check data, receiving the analysis result of the check data, the user may change the setting for color print to "OFF" and then send the print job. Hence, if the correction process for color print is being carried out (S143: Yes), then because the correction for color print is unneeded, the printer 100 stops the correction process for color print (S144; an example of the process of the stop section). This prevents time delay of printing start from happening due to useless preparation operations. After the step S144, or if the correction process for color print is not being executed (S143: No), the process proceeds to the step S147. If the setting for color print is "ON" (S142: Yes), then the process proceeds to the step S145. In the step S145, it is judged whether or not the correction process for color print has been executed. If the correction process for color print has not yet been executed (S145: No), then the correction process for color print is executed (S146). After the step S146, or if the correction process for color print has already been executed (S145: Yes), the process proceeds to the step S147.

Next, the printer 100 judges whether or not the type of printing paper is set to be thick paper in the print setting of the print job, that is, whether or not it satisfies the execution condition for executing a preparation operation for printing (S147; an example of the process of the second judgment section). If the type of printing paper is not set to be thick paper, that is, the execution condition is not satisfied (S147: No), then the printer 100 judges whether or not the warm-up of the heater of the fixation device 8 is being executed, that is, whether or not the preparation operation corresponding to the execution condition is being executed (S146; an example of the process of the execution judgment section). If the warm-up is being executed (S146: Yes), then the printer 100 stops the warm-up (S147; an example of the process of the stop section). Analogous to the process in the step S144, this prevents time delay of printing start from happening due to useless preparation operations, and saves power. After the step S149, or if the warm-up is not being executed (S148: No), or if the type of printing paper is set to be thick paper (S147: Yes), then the process proceeds to the step S150. In this manner, in the preferred embodiment, there are a plurality of preparation operations for printing, and for each of the preparation operations, an execution condition is set for executing the preparation operation. Then, the printer 100 judges whether or not the print setting of the check data 90 satisfies the execution condition corresponding to each preparation operation, respectively.

Next, the printer 100 judges whether or not all preparation operations for printing are completed (S150). Whether or not the correction for color print is ended or stopped is judged by whether or not the completion flag of correction for color print is set (if the completion flag of correction for color print is set, then because the correction for color print is ended or stopped, it is possible to start printing). Whether or not the warm-up is ended or stopped is judged by whether or not the completion flag of warm-up is set (if the completion flag of warm-up is set, then because the warm-up is ended or stopped, it is possible to start printing). Whether or not the print data reception is ended is judged by whether or not the completion flag of receiving print data is set (if the completion flag of receiving print data is set, then because the print data reception is ended, it is possible to start printing). Whether or not all preparation operations for printing are completed is judged by whether or not various flags of such kinds are all set. If the preparation operations for printing are not all completed (S150: No), then the printer 100 stands by until all preparation operations for printing are completed. On the other hand, if the preparation operations for printing are all completed (S150: Yes), then the printer 100 starts the printing operation (S151; an example of the process of the printing section). Thereafter, the printer 100 stops and resets the timer (S124), and then ends the reception process.

Figure 7A:
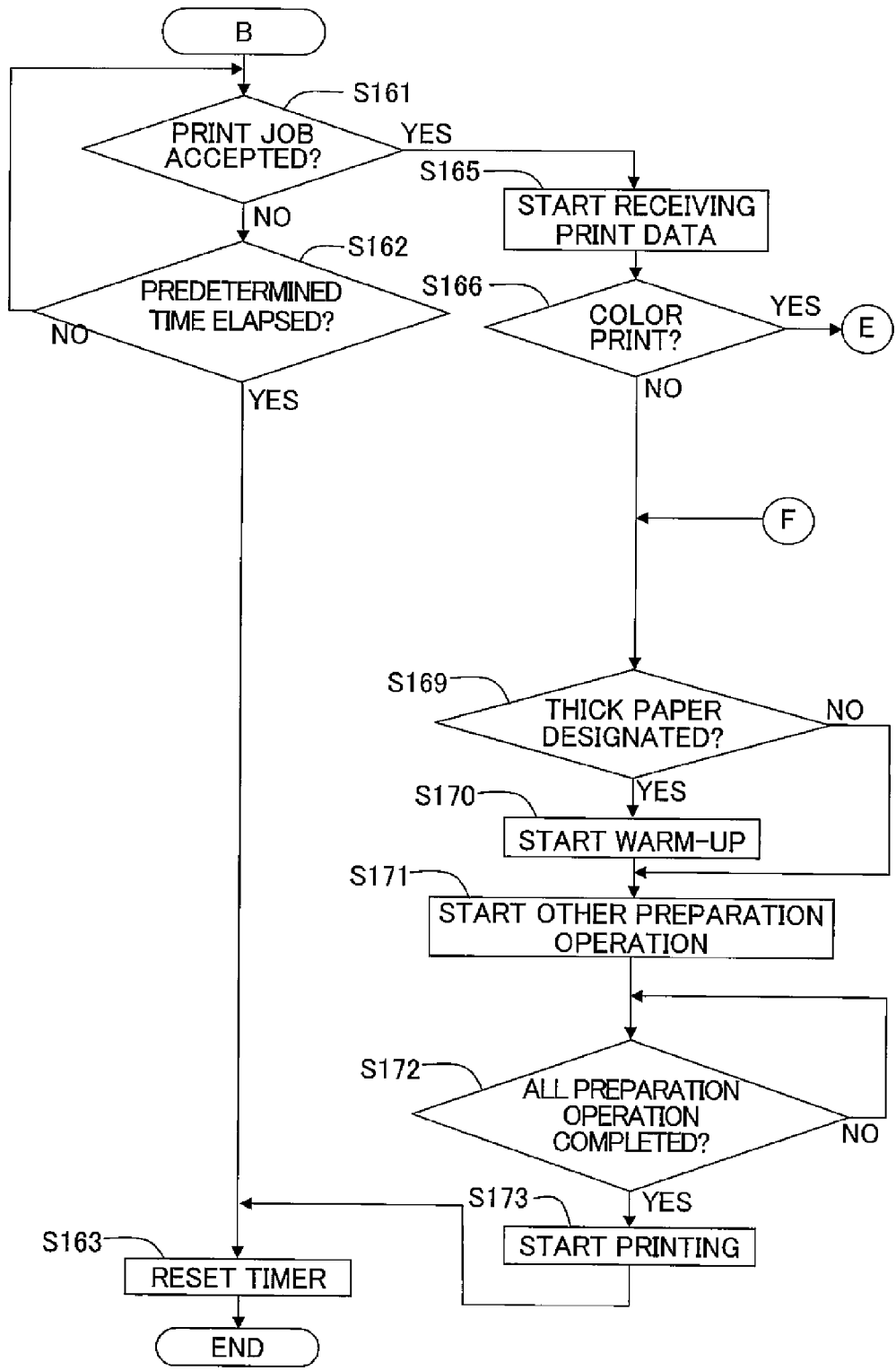
Figure 7B:
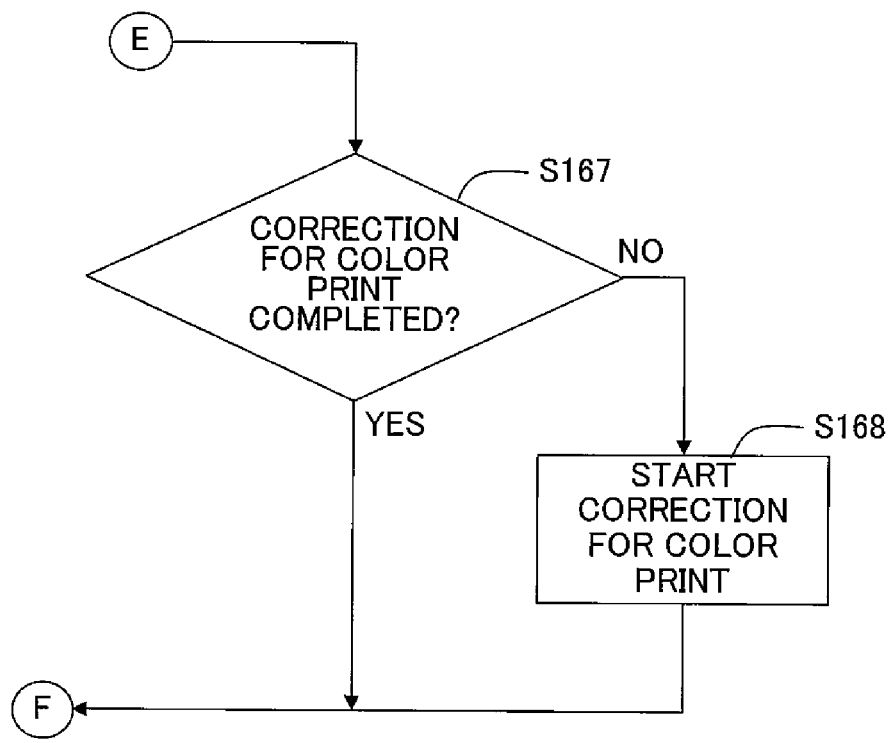

In "B" of FIG. 7A, the printer 100 judges whether or not the print job is accepted from the PC 200 which has sent the check data (S161). If the print job is not accepted (S161: No), then the printer 100 judges whether or not the count of the timer is equal to or more than a predetermined time (S162). If the count of the timer is less than the predetermined time (S162: No), then the printer 100 returns to the step S161 to wait to receive the print job. Further, the predetermined time in the step S162 is set, for example, to be approximately two to three minutes.

If the count of the timer is equal to or more than the predetermined time (S162: Yes), then the printer 100 judges that the user has either cancelled the print command or had no desire for the print. Therefore, the printer 100 stops and resets the timer (S163), and ends the reception process.

On the other hand, if the print job is accepted from the PC 200 which has sent the check data (S161: Yes), then the print data reception is started (S165; an example of the process of a data reception section). The received print data is stored in a memory area. If the print data reception is started, then the process as shown in FIG. 10 is started in parallel.

After the step S165, the printer 100 judges whether or not the setting for color print is "ON" in the print setting for the print job (S166; an example of the process of a second judgment section). If the setting for color print is "OFF" (S166: No), then the process proceeds to the step S169. If the setting for color print is "ON" (S166: Yes), then the process proceeds to the step S167. In the step S167, the printer 100 judges whether or not the correction process for color print has been executed. That is, it judges whether the completion flag of correction for color print is set or reset. If the correction process for color print has not yet been executed (S167: No), then the printer 100 starts the correction process for color print (S168). After the step S168, or if the correction process for color print has already been executed (S167: Yes), the process proceeds to the step S169.

Next, the printer 100 judges whether or not the setting for paper type is thick paper in the print setting for the print job (S169; an example of the process of the second judgment section). If the setting for paper type is thick paper (S169: Yes), then the printer 100 starts the warm-up of the heater of the fixation device 8 (S170). If the setting for paper type is not thick paper (S169: No), then the process proceeds to the step S171. In the step S171, the printer 100 starts other preparation operations for printing. After starting the other preparation operations for printing, the process proceeds to the step S172.

Next, the printer 100 judges whether or not all preparation operations for printing are completed (S172). Whether or not all preparation operations for printing are completed is judged by whether or not the completion flags for all preparation operations are set. If the completion flags for all preparation operations are set, then the printer 100 judges that all preparation operations for printing are completed. Even if only one completion flag for a preparation operation is not set, the printer 100 does not judge that all preparation operations for printing are completed. If the preparation operations for printing are not all completed (S172: No), then the printer 100 stands by until all preparation operations for printing are completed. On the other hand, if the preparation operations for printing are all completed (S172: Yes), then the printer 100 starts the printing operation (S173; an example of the process of the printing section). Thereafter, the printer 100 stops and resets the timer (S163), and then ends the reception process.

As explained in detail hereinabove, the printer 100 of the embodiment starts various preparation operations for printing on the occasion of accepting a check request as a preliminary inquiry before receiving the print data. By virtue of this, it is expectable for the printer 100 to finish a printing process in a short time as a result of starting the preparation operations at an early stage. That is, because the preparation operations are started on receiving the check data 90 before the print data is received, the waiting time, from receiving the print data until the preparation operations are completed and it is possible to start the printing operation, is reduced by the length from receiving the check data to receiving the print data, compared with the case of starting the preparation operations on receiving the print data.

Further, the preferred embodiment is merely an exemplification, and thus by no means limits the present teaching. Therefore, as a matter of course, it is possible to apply various modifications and changes to the present teaching without departing from the true spirit and scope thereof. For example, it is possible to let multifunction printing apparatuses or copying machines play the role of the printer as long as they are provided with a printing function. Further, the information processing device for inputting the print job to the printer should not be limited to a PC but may as well be a mobile terminal such as smartphones and the like.

Further, in the preferred embodiment, although the print job is sent directly from the PC 200 to the printer 100, it is not limited to this transmission route but may as well be sent, for example, from the PC 200 to the printer 100 via the server 300.

Further, in the preferred embodiment, although the printer 100 starts the preparation operations for printing on the occasion of receiving a check request, the condition for starting the preparation operations for printing is not limited to this. That is, the timing may be either the reception of a preliminary inquiry for print prevision or, for example, the reception of a notification request of capability information received earlier than the check request. Even when receiving the notification request of capability information, because it increases the possibility of sending the print data to the printer 100, the preparation operations for printing may as well be started. Further, because the notification request of capability information is received earlier than the check request, it is possible to shorten the waiting time from receiving the print data until starting printing. On the other hand, since the timing of outputting the notification request of capability information is still in the stage of searching for a printer, it is not obvious which printer the user will utilize. Therefore, compared with the timing of outputting the check request, there is also a high possibility that the print data is not sent. Hence, in order to reduce useless preparation operations for printing, it is preferable to start the preparation operations on receiving the check request.

Further, the preliminary inquiry for starting the preparation operations for printing may be the check request (an example of the check request in the print setting), the notification request of capability information, or other requests such as a request to search for printers, a request to acquire printer's conditions, etc. The request to search for printers is a request to inquire about whether or not the object is a printer, and is outputted, for example, when a PC displays the list of printers. Further, the request to acquire printer's conditions is a request to inquire about printer's status, and is outputted, for example, when a PC displays the condition of each printer.

Further, in the embodiment, although the setting for color print and the setting for the type of printing paper are utilized to judge whether or not to start the preparation operations, the condition for starting the preparation operations is not limited to those settings. For example, in the print setting of the check data 90, if a high resolution is set to be greater than a predetermined value, then correction of positional deviation may as well be started.

Further, in the preferred embodiment, although a judgment is not carried out according to each user who has created a print data, it may as well be carried out for a specific user. For example, the printer 100 manages the printing history according to each user name included in the check data 90, and judges whether or not the user has a high tendency to carry out printing even though the analysis result of the check data 90 includes information indicating that printing is not possible. When receiving a check request from such a user, even if there is an unprintable item in the print setting of the check data 90 (that is, even if the step S102 is "NO"), the printer 100 may still let the process proceed to the step S103 to start the preparation operations for printing.

What is claimed is:
1. An image formation apparatus which is configured to communicate with an external device and which is configured to form an image based on a print data, wherein the print data is associated with a print setting, sent from the external device, the apparatus comprising:

a request receiving section configured to receive a check request, from the external device, with respect to the print setting;

a response section configured to respond to the external device with a check result after the request receiving section receives the check request;

a data receiving section configured to receive the print data associated with the print setting from the external device after the response section responds to the external device;

a printing section configured to execute printing based on the print data received by the data receiving section;

a preparation operation section configured to execute a preparation operation for printing based on the print data; and a judgment section configured to judge as to whether or not the print setting satisfies a start condition for starting the preparation operation under a condition that the request receiving section receives the check request;

wherein: under a condition that the request receiving section receives the check request and the judgment section judges that the print setting satisfies the start condition, the preparation operation section starts the preparation operation corresponding to the print setting before the data receiving section receives the print data; and under a condition that the request receiving section receives the check request and the judgment section judges that the print setting does not satisfy the start condition, the preparation operation section does not start the preparation operation corresponding to the print setting before the data receiving section receives the print data.

2. The image formation apparatus according to claim 1,
wherein the judgment section judges as to whether or not the print setting includes color-print setting as the start condition, the preparation operation section starts a correction process for color print as the preparation operation under a condition that the judgment section judges that the print setting includes the color-print setting, and the preparation operation section does not start the correction process under a condition that the judgment section judges that the print setting does not include the color-print setting.

3. The image formation apparatus according to claim 1,
wherein the judgment section judges as to whether or not the print setting includes paper-type setting of thick paper as the start condition, the preparation operation section starts warm-up of a fixation device as the preparation operation under a condition that the judgment section judges that the print setting includes the paper-type setting of thick paper, and the preparation operation section does not start the warm-up under a condition that the judgment section judges that the print setting does not include the paper-type setting of thick paper.

4. The image formation apparatus according to claim 1, further comprising:

a second judgment section configured to judge as to whether or not the print setting associated with the print data satisfies an execution condition for executing the preparation operation under a condition that the data receiving section receives the print data;

an execution judgment section configured to judge as to whether or not the preparation operation corresponding to the execution condition is being executed under a condition that the second judgment section judges that the execution condition is not satisfied; and a stop section configured to stop the preparation operation under a condition that the execution judgment section judges that the preparation operation is being executed.

5. The image formation apparatus according to claim 4,
wherein the preparation operation section executes a correction process for a color print as the preparation operation, the second judgment section judges as to whether or not the print setting includes color-print setting as the execution condition, and the execution judgment section judges as to whether or not the correction process is being executed under a condition that the second judgment section judges that the print setting does not include the color-print setting.

6. The image formation apparatus according to claim 4,
wherein the preparation operation section executes warm-up of a fixation device as the preparation operation, the second judgment section judges as to whether or not the print setting includes paper-type setting of thick paper as the execution condition, and the execution judgment section judges as to whether or not the warm-up is being executed under a condition that the second judgment section judges that the print setting does not include the paper-type setting of thick paper.

7. The image formation apparatus according to claim 1, further comprising a print judgment section configured to judge as to whether or not it is possible to execute the printing which satisfies the print setting under a condition that the request receiving section receives the check request with respect to the print setting associated with the print data, wherein the preparation operation section starts the preparation operation for the printing under a condition that the print judgment section judges that it is possible to execute the printing, and the preparation operation section does not start the preparation operation for the printing under a condition that the print judgment section judges that it is not possible to execute the printing.

\* \* \* \* \*